(12) United States Patent
Chen

(10) Patent No.: US 6,803,696 B2
(45) Date of Patent: Oct. 12, 2004

(54) MAGNET MOTOR DEVICE

(76) Inventor: Ming Yan Chen, P.O. Box 82-144, Taipei (TW)

( * ) Notice: Subject to any disclaimer, the term of this patent is extended or adjusted under 35 U.S.C. 154(b) by 4 days.

(21) Appl. No.: 10/407,272

(22) Filed: Apr. 7, 2003

(65) Prior Publication Data

US 2003/0201692 A1 Oct. 30, 2003

Related U.S. Application Data

(62) Division of application No. 09/976,003, filed on Oct. 15, 2001, now Pat. No. 6,717,324.

(51) Int. Cl.[7] .............................. H02K 1/28; H02K 1/27; H02K 7/18
(52) U.S. Cl. ............. 310/268; 310/156.19; 310/156.32; 310/156.38; 310/67 A; 310/75 R; 310/78
(58) Field of Search ........................... 310/268, 156.19, 310/156.32, 156.38, 67 A, 75 R, 78

(56) References Cited

U.S. PATENT DOCUMENTS

| 4,996,457 A | * | 2/1991 | Hawsey et al. | ............. 310/268 |
| 5,977,684 A | * | 11/1999 | Lin | ............................ 310/268 |
| 5,982,070 A | * | 11/1999 | Caamano | ..................... 310/216 |
| 6,373,162 B1 | * | 4/2002 | Liang et al. | ........... 310/156.53 |
| 6,605,883 B2 | * | 8/2003 | Isozaki et al. | ............ 310/49 R |

* cited by examiner

Primary Examiner—Tran Nguyen
(74) Attorney, Agent, or Firm—Leong C. Lei

(57) ABSTRACT

The present invention relates generally to a magnet motor, and having being provided the driven power of the electromagnet motor for electric vehicles, wherein, it has provided with a wireless coil whole rotator, which the upper part has been constructed with an equal angle, a power perpetual magnet is provided. At least one set of a magnet pole coil is formed into an electromagnet pole module and a circuit control unit. Using the perpetual magnet and the less electricity consumption of an electric magnet pole generates the repelling torque, accomplishing the object of the turning rotator to generate power. Either it is coupled with a simple or a complex structure; it can apply to be the driven motor of a bicycle, a motorcycle and a car. Moreover, it can greatly reduce the consumption of the vehicle battery electricity, and make it to be an environmental protection and practical vehicle means.

5 Claims, 13 Drawing Sheets

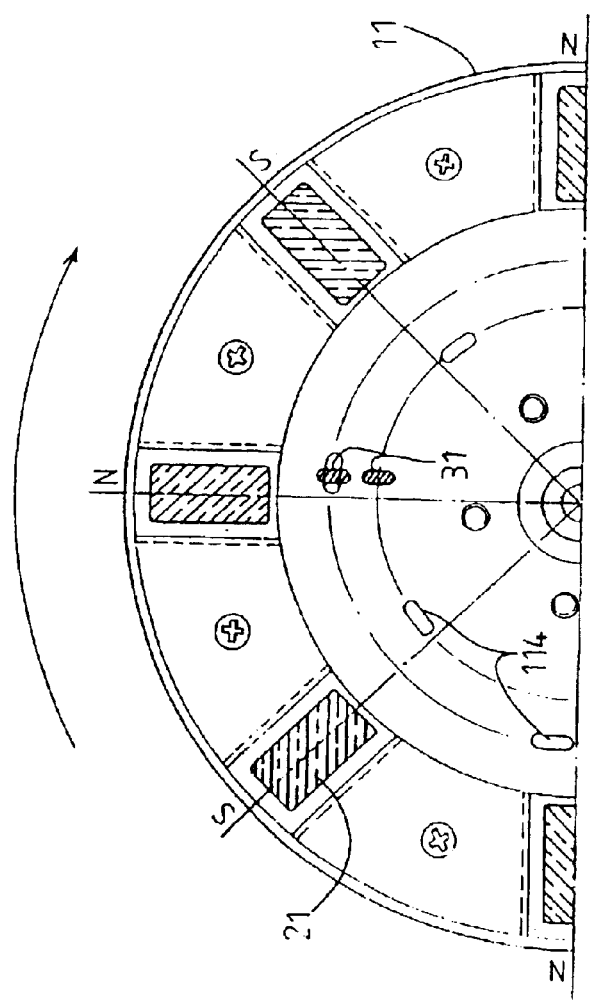
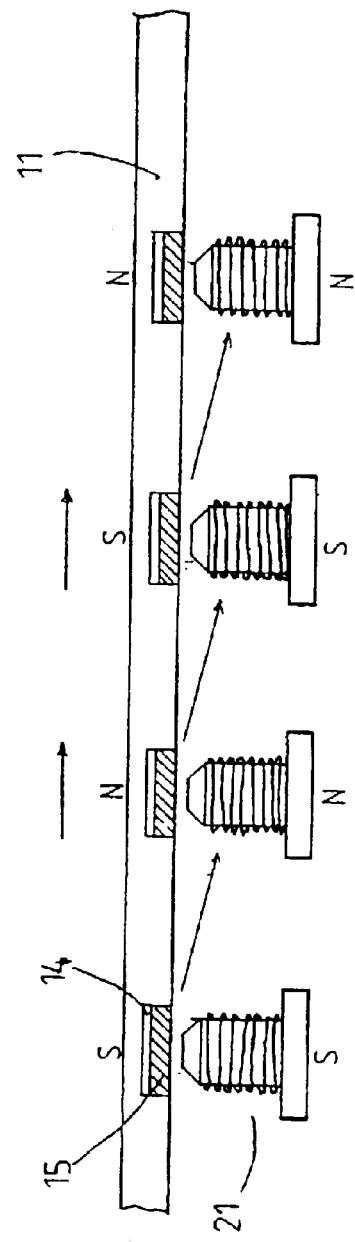
FIG. 5a
FIG. 5b

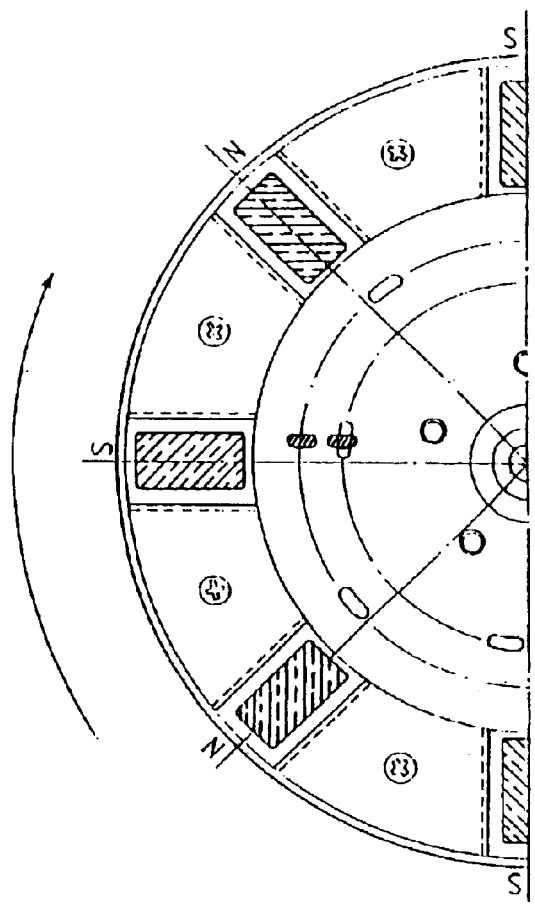
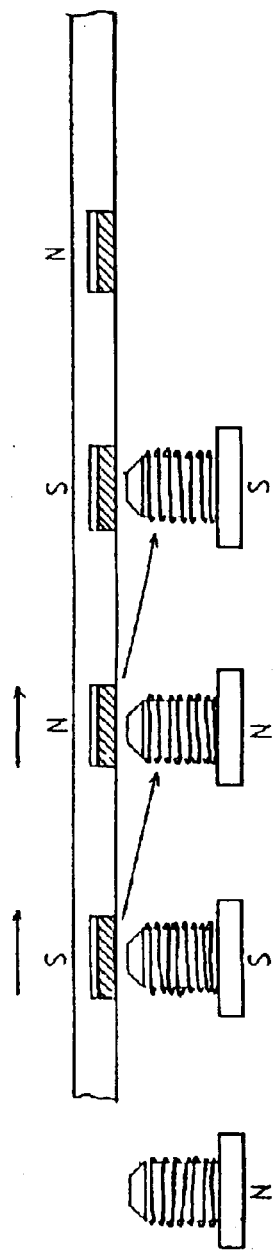
FIG. 8a
FIG. 8b

MAGNET MOTOR DEVICE

This is a divisional of application Ser. No. 09/976,003, filed Oct. 15, 2001, now U.S. Pat. No. 6,717,324.

BACKGROUND OF THE INVENTION a. Field of the Invention

The present invention relates generally to a magnet motor device, and in particular, a magnet motor, which generates the driven power for electric vehicles.

b. Brief Description of the Prior Art

The current electric vehicles are mainly divided into an electric bicycle, an electric motorcycle and an electric car, and their power sources are generally from batteries supplied to electric motors by turning the driven vehicles moving forward. But these used to electric motors having their disadvantages are mentioned in the following:

1. The rotation of the electric motor the change can be achieved with the battery supplied electricity size. Therefore, in the condition of rapid drive for longer hours, it definitely increases the battery electricity consumption rate, and relatively, the vehicle will tend to continue drive in a shorter period.

2. In order to increase the continuous driving power of the vehicle, there shall require loading two or more batteries, and unintentionally, it not only increases the load of the vehicle, but also increases the consumption of the battery electricity.

SUMMARY OF THE INVENTION

The present invention relates generally to a magnet motor, and having being provided with the driven power of the electromagnet motor for electric vehicles, wherein, it has provided with a wireless coil rotator. Using the structure of a power perpetual magnet and the less electricity consumption of an electric magnet pole generate the repelling torque, accomplishing the object of the tuning rotator to generate power. Either it is coupled with a simple or a complex structure; it can apply to be the driven motor of a bicycle, a motorcycle and a car. Moreover, it can greatly reduce the vehicle battery electricity consumption, and make it to be an environmental protection and practical vehicle means.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIGS. 5a, 5b are the action flow chart schematic views of the present invention.

FIGS. 8a, 8b are the action flow chart schematic views of the present invention.

FIG. 11b is the partial structure schematic view of the transmission clutch gear for the FIG. 11a.

DETAILED DESCRIPTION OF THE PREFERRED EMBODIMENT

Figure 1:
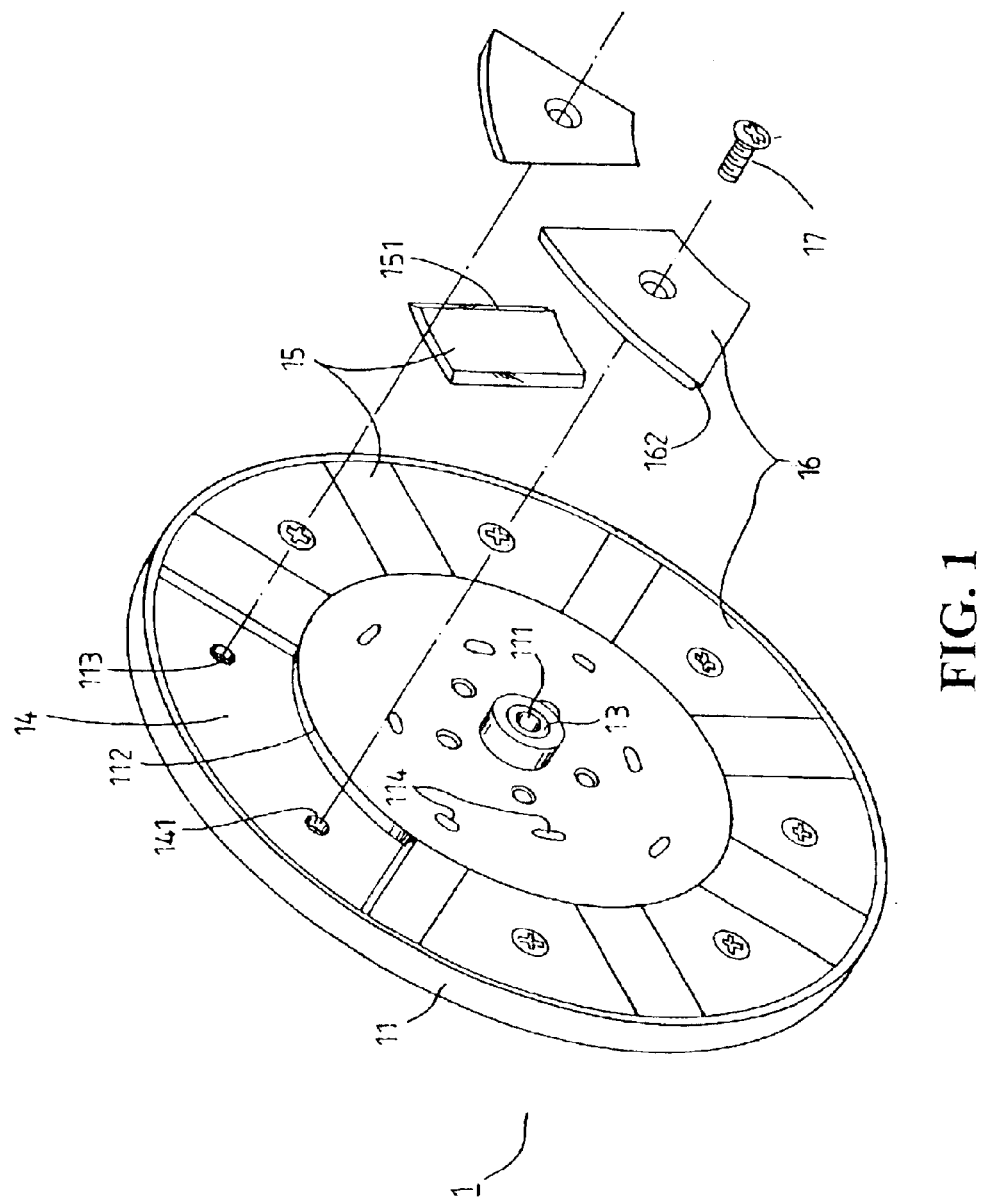
FIG. 1 is the assembly schematic view of the whole rotator.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

The present invention relates generally to a magnet motor of an electric vehicle, comprising a whole rotator 1, an electric magnet pole module 2, and a circuit control unit 3.

Figure 3C:
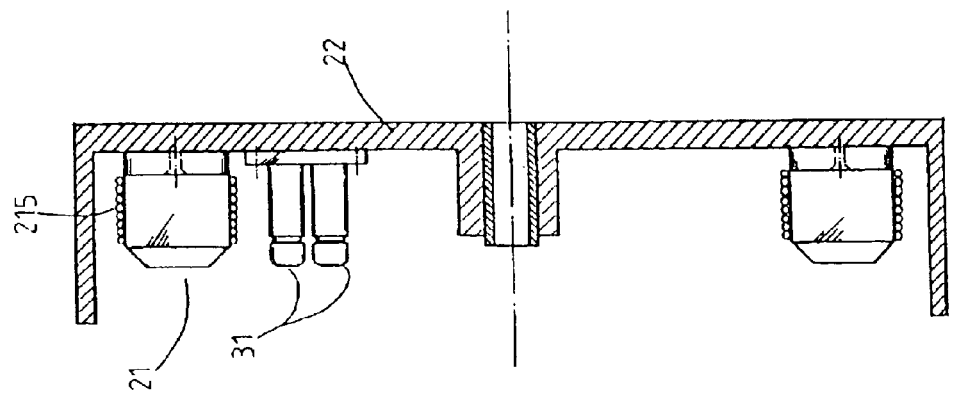
FIG. 3c is the site relation view of the electromagnet pole module and their relative components.
Figure 3B:
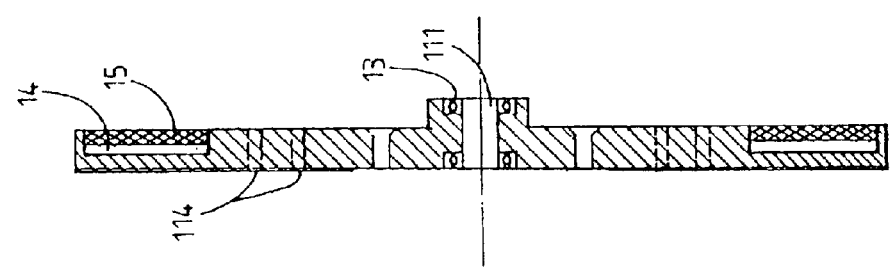
FIG. 3b is the perspective exploded view of the whole rotator.
Figure 3A:
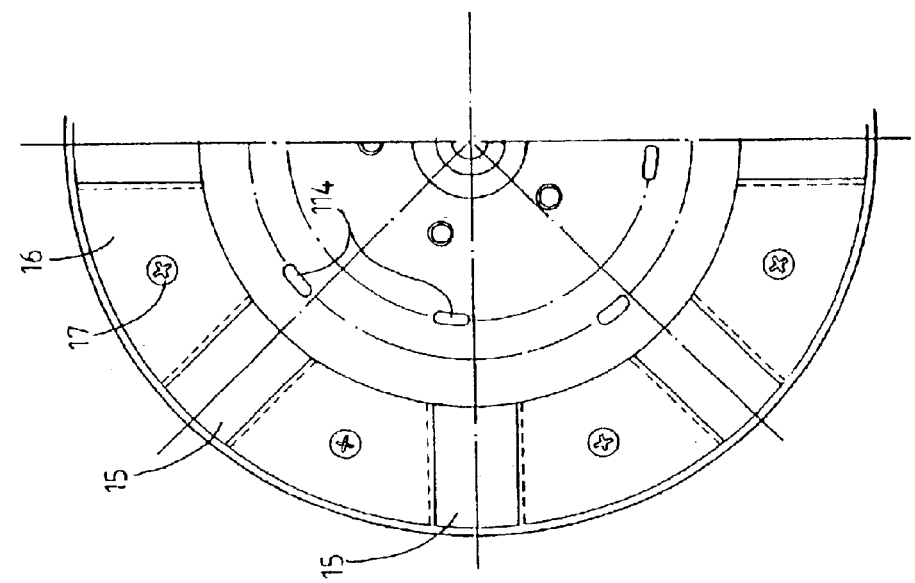
FIG. 3a is the sectional perspective exploded view of the whole rotator.
Figure 4:
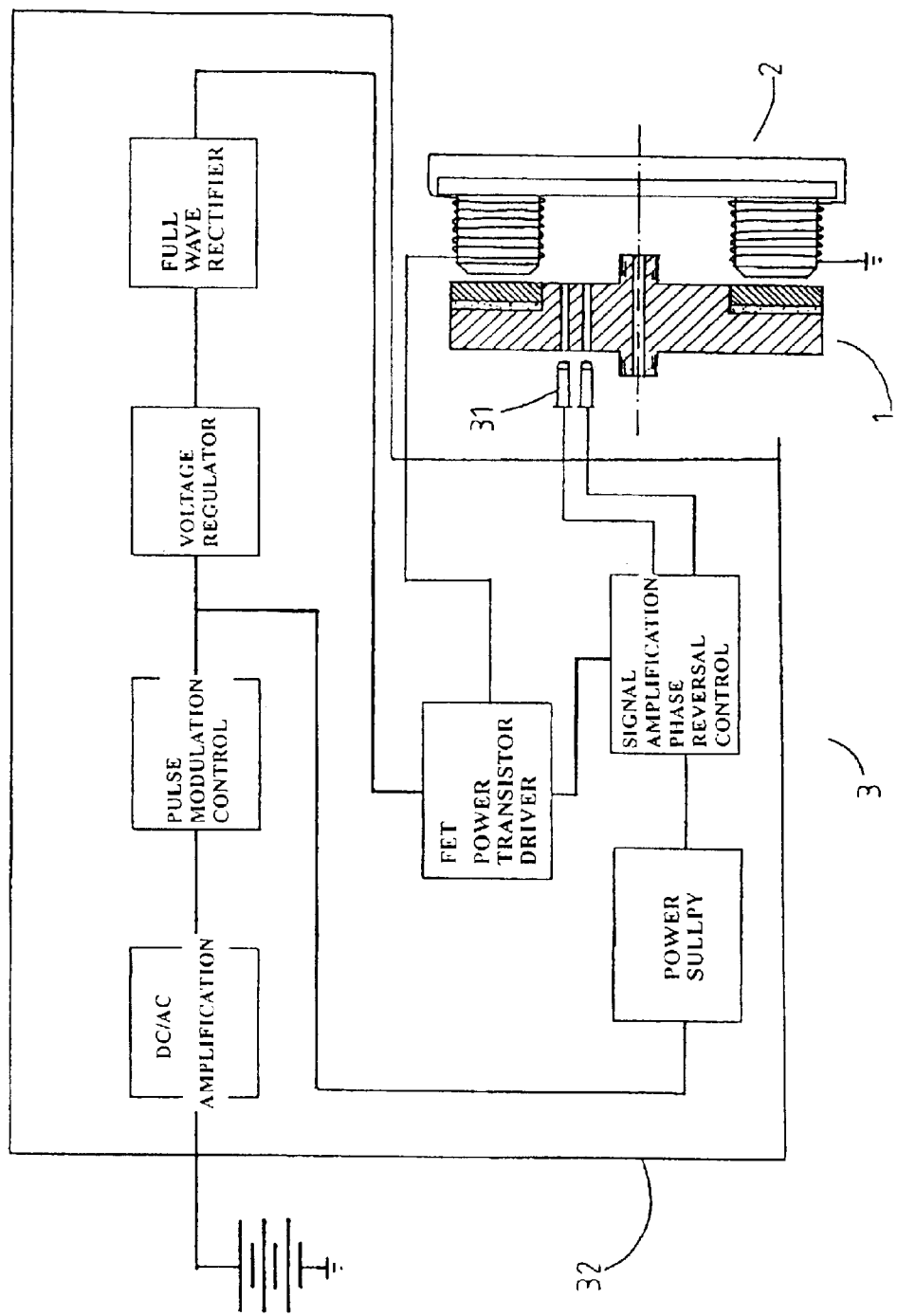
FIG. 4 is the control flow chart of the circuit controller.

The whole rotator 1, (refer to FIGS. 1, 3a, 3b), has constructed with a circular disc housing, having more than one set equal angle of the perpetual magnets are provided. The circular disc housing acts as a turning disc 11 for turning; at the center part, a center axle 12 is provided to pass through a through hole 111, and both sides of the through hole 111, an axle bearing 13 is provided separately. Along an outer ring of the turning disc 11, a ring recess 112 is drilled with a round inner cavity; a conductive magnet board 14 is mounted on and left with an appropriate depth. The conductive magnet board 14 on its equal angle location is drilled with plurality of a bore hole 141 uprightly to the main housing of the turning disc 11 and become a blind hole, and the internal screws threads 113 are mounted separately. On the conductive magnet board 14, they have more than one set N poles and S poles of perpetual magnets are mounted, which in the array manner of adjacent opposite poles and correspondent it poles. A pressing board 16 is pressed in between two opposite pole magnets, and a stud 17 will pass through a through hole 161 of the pressing board 16 and screw to the internal screw thread 113 of the turning disc 11, and a perpetual magnet 15 is fastened. Perpetual magnets are divided into an N pole and an S pole, which the shape of both sides is in parallel; shapes of the top and bottom are coincided with the ring recess 112. The lateral shape is from the top downwards to the decline of an exact slant side 151, and the shape of the N pole magnet and the size of the thickness are larger than the S pole magnet. The above-mentioned shape of the pressing board 16 is like a fan, shapes of the top and bottom are coincided with the ring recess 112. Both sides of the left and right are closed with shapes of both opposite pole magnets; the lateral shape is from the top downwards to the decline of an opposite slant side 162. As those pressing boards 16 are set to press each magnet, the whole ring recess 112 will be totally filled up. Other, (refer to FIGS. 3a, 3b), on the lower part of each magnet, and the shape on the same side of the symmetry line, a site probe hole 114 is provided to pass through the turning disc 11. A N pole probe hole and a S pole probe hole are separately arrayed on the different of the concentric circles, and the length of each site probe hole is started from the edge of the extension line of the perpetual magnet and finished before the symmetry line of the perpetual magnet.

Figure 2:
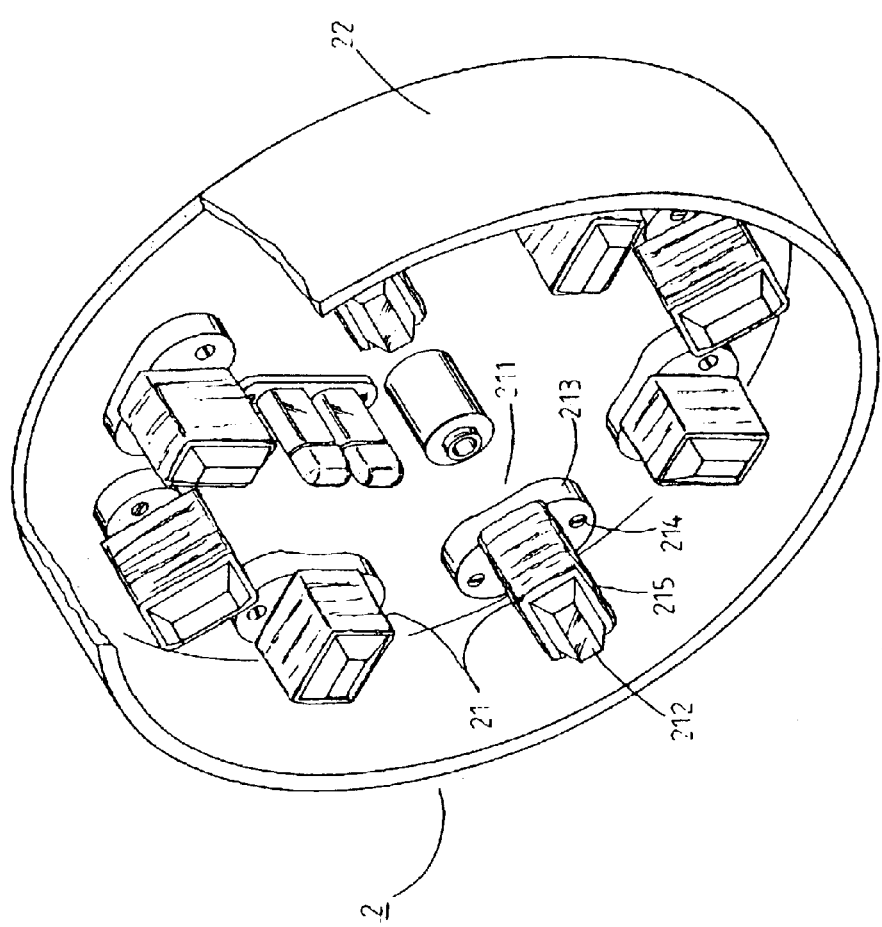
FIG. 2 is the assembly schematic view of the electromagnet pole module.

An electric magnet pole module 2, (refer to FIGS. 2, 3c), is a combination with plurality of a magnet pole coil 21 generating magnet poles. The magnet pole coil 21 is mainly comprised with the combination of a high conductive magnet ceramic or a high conductive silicone steel piece of a conductive magnet coil seat 211. The shape of an end portion 212 of the conductive magnet coil seat 211 is retracted towards to the center; a seat housing 213, a screw hole 214 is provided. And then again, the conductive coil seat 211 in the same direction is wrapped with a varnish cover thread 215 and become a magnet pole coil 21. The magnet pole coil 21 with the same plurality of the perpetual magnet 15, having an equal angles are mounted with a shell housing 22, and letting each magnet pole 21 is precisely corresponding to the perpetual magnet 15. The mentioned shell housing 22 is round cover housing, is provided with the cover protection of the whole rotator 1. Besides, those magnet pole coils 21 are screwed mounting and also fixed at the support.

A circuit control unit 3, comprises a site sensor 31 and a circuit controller 32, wherein, the site sensor has two units, which are located separately at a site probe hole 114, and set in array to form into two concentric circles in front, (in FIG. 5a). When the site sensor 31 is in face of the geometry center of the site probe hole 114, the magnet pole coil 21 will face to the perpetual magnet 15. The loops of the site sensor 31 and the magnet pole coil 21 are all connected to the circuit controller 32, where it controls the whole management.

Figure 6A:
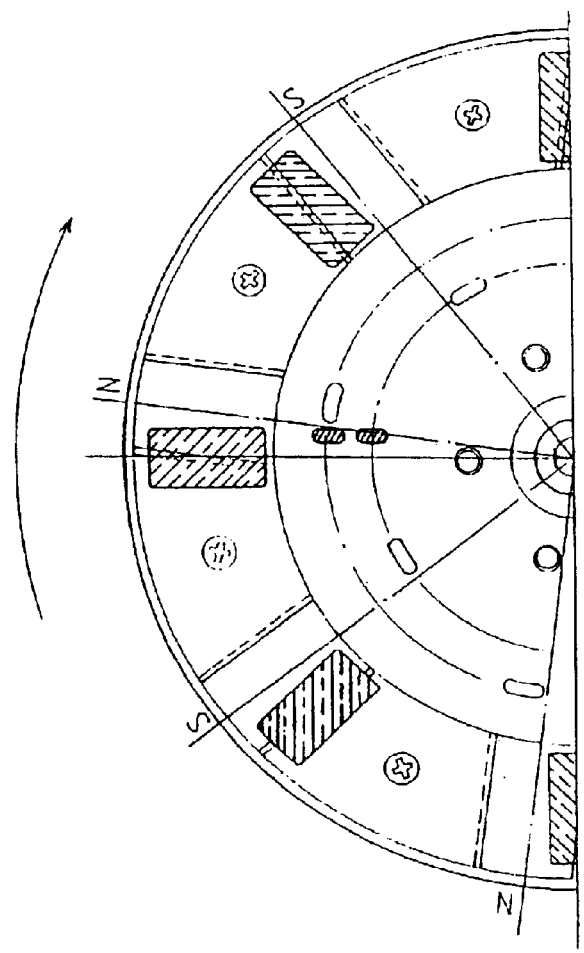
FIGS. 6a, 6b are the action flow chart schematic views of the present invention.
Figure 6B:
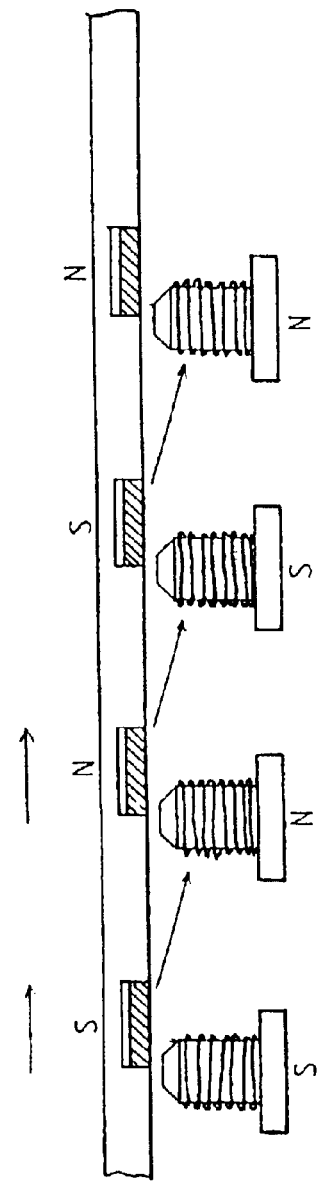
Figure 7A:
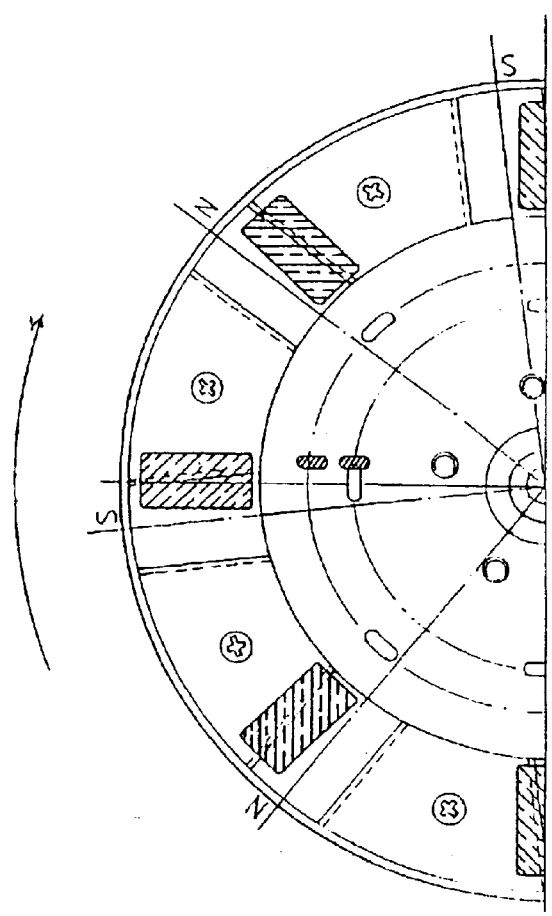
FIGS. 7a, 7b are the action flow chart schematic views of the present invention.
Figure 7B:
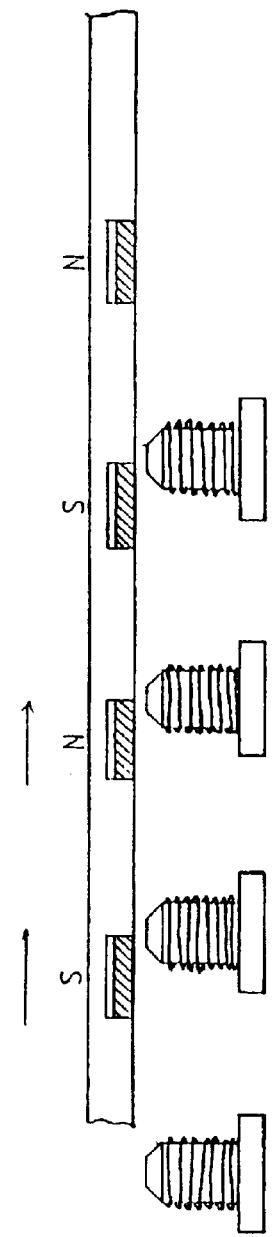

After the above-mentioned components have been assembled, assuming that the external circle of the site probe hole 114 has become a site probe hole of a N pole magnet, and the internal circle of the site probe hole 114 has become a site probe hole of a S pole magnet. When the site sensor 31 is in face of the N pole site probe hole 114, the upper part and the magnet pole coil 21 that face to the perpetual magnet will become the N pole perpetual magnet. As the motor current is switched on, the circuit controller 32 will be given out a weak voltage, allowing the magnet pole coil 21 to generate the magnetic polarity, and the opposite pole of the perpetual magnet will approach to get the position, (in FIGS. 5a, 5b). While the whole rotator 1 is being got the position, when the electric door is switched on, it will transmit the normal working voltage. If the site sensor detects the present front is the N pole magnet, at this instance; the front of the magnet pole coil 21 of all N poles will generate magnetic N poles. Meanwhile, the front of the magnet pole coil 21 of the S pole magnets will generate magnetic S poles, allowing the magnetism of the magnet pole coil 21 and the perpetual magnet are inter repelling, and drive the whole rotator in turning, (in FIGS. 6a, 6b). When the site sensor 31 is exceeding the site probe hole 114 range, the circuit controller 32 will stop supply voltage to each magnet pole coil, using the magnetism residue of the utmost coil can attract the whole rotator for continuous turning, (refer to the FIGS. 7a, 7b). When the site sensor 32 is entered into the site probe hole 114 range, detects the nearby perpetual magnet as a S pole magnet, the circuit controller 32 will then push the reverse voltage away to each pole magnet coil. Due to the relation in voltage delay, at this instance, the magnetism of the magnet pole coil has still not yet completed, (refer to the FIGS. 8a, 8b). As long as the perpetual magnet reaches to the front of the magnet pole coil, then all S pole magnets to the front of magnet pole coils 21 will generate the electromagnetism of their polarities. All N pole magnets to the front of magnet pole coils 21 will generate magnetic N poles, and as both are under inter repelling, the whole rotator will be in continuous tuning again. Under the condition of polarities of magnet pole coils are interchangeable and inter action with perpetual magnets, the whole rotator shall be in continuously action and increasingly it turning velocity. When the turning velocity is being reached to a certain velocity of the whole rotator, the circuit controller 32 will instruct one of site sensors 31 to stop work. If only the N pole site sensor 31 is working, the N pole perpetual magnet will come close, only then the supply voltage of the magnet pole coil is relative to the N pole magnet, and pushes away the N pole magnet to facilitate turning. While the electric door is switched off, the circuit controller 32 will stop supply the normal working voltage, and transmits a micron fixed voltage of the same poles, which attracts the opposite pole of the perpetual magnet coming close to set the position.

Figures 9A, 9B:
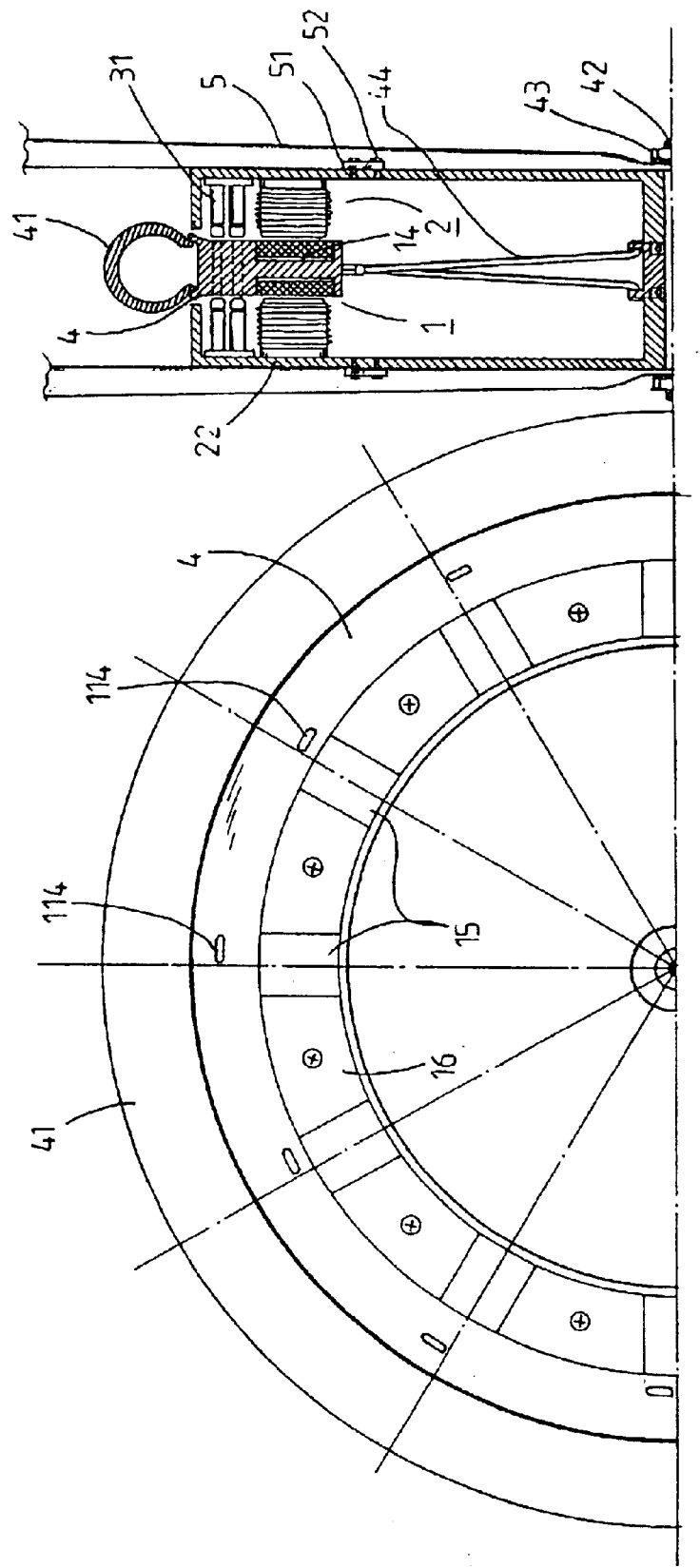
FIG. 9a is the allocation schematic view of the site probe hole and the perpetual magnet of the first preferred embodiment of the present invention.
FIG. 9b is the partially sectional structure schematic view of the first preferred embodiment of the present invention.

The preferred embodiment of the present invention for the bicycle structure in FIGS. 9a, 9b, comprising a wheel case 4, as a component of a whole rotator 1, in which the same structure shall has at least one set N pole and S pole of a perpetual magnet 15 thereto. A pressing board 16 is mounted on a conductive magnet board 14, and on the upper part of each magnet and the shape on the same side of the symmetry line, a N pole and S pole of a site probe hole 114 is provided to pass through the wheel case 4. They are separately arrayed on the different of the concentric circles, and the length of each site probe hole is started from the edge of the extension line of the perpetual magnet and finished before the symmetry line of the perpetual magnet. As to increase power, both sides of the wheel case, a set of an electromagnet pole module 2 is separately mounted (in FIG. 9b), and a wheel axle center 42 that pass through the electromagnet pole module 2 of a shell housing 22, a screw nut 43 is fastened at both ends. A bolt seat 51 is protruded out from a support 5, in which a bolt 52 can pass through and screw on the shell housing 22. A circuit controller 32 controls all current directions of a site sensor 31 and the electromagnet pole module 2. Besides, it structure can mount either with a front or a rear wheel.

Figure 10A:
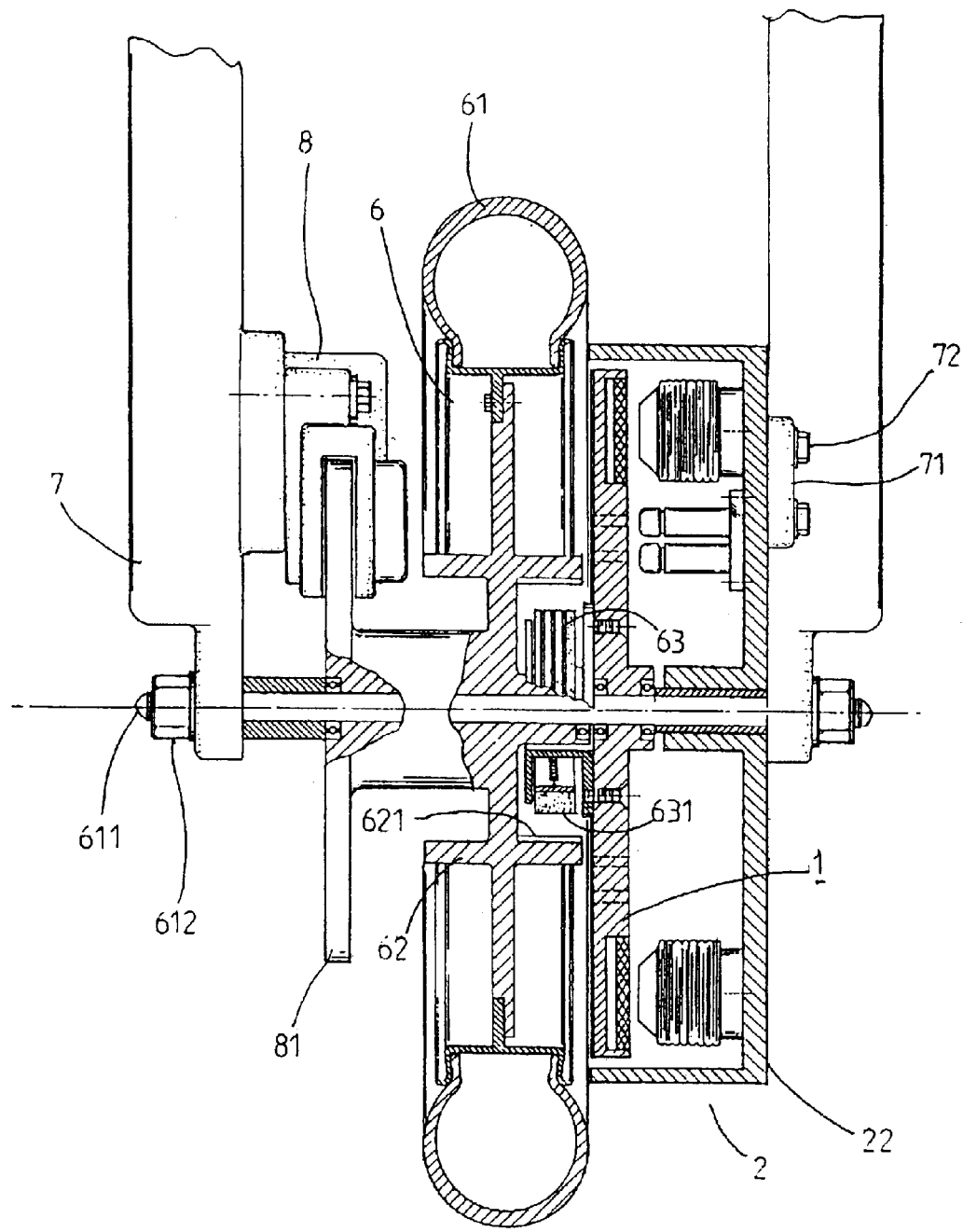
FIG. 10a is the allocation schematic view of the plate type triggering apparatus and its relative components of the second preferred embodiment of the present invention.
Figure 10B:
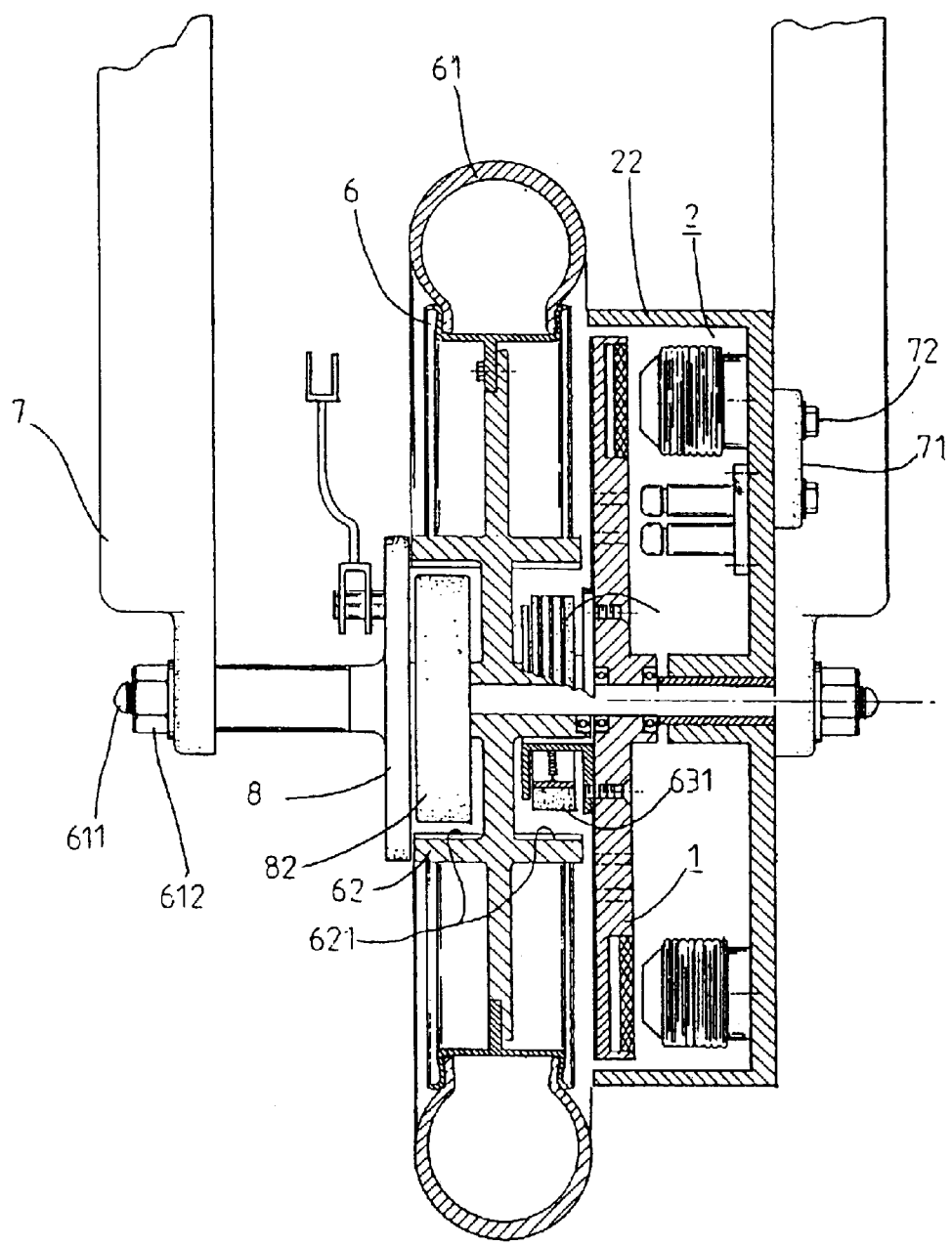
FIG. 10b is the allocation schematic view of the drum type triggering apparatus and its relative components of the second preferred embodiment of the present invention.

As shown in FIGS. 10a, 10b, having being another preferred embodiment of the present invention for the motorcycle, wherein, is comprised a wheel case 6, an external ring as a tire 61, a wheel drum center 62 is divided into two half portions, and the inner face of the wheel drum, a good resistant material of a friction face 621 is provided. A clutch 63 is mounted with a whole rotator 1, and near one side of the wheel drum 62, which is placed into the wheel drum. A triggering apparatus 8 can either be a plate type (FIG. 10*a*) or a drum type (10*b*). A wheel axle center 611 will follow the sequences pass through a support 7, an electromagnet pole module 2 of a shell housing 22, the whole rotator 1, the centrifugal clutch 63, the wheel drum 62, the triggering apparatus 8, and both ends of the support 7 are fastened with screw nuts 612, and it accomplishes the whole driving structure of the electromagnet motor. A bolt seat 71 is protruded out from a support 7, in which a bolt 72 can pass through and screw on the shell housing 22. While riding, as the electric door is switched on to transmit the normal working voltage, a certain velocity is being reached for the turning rate of the whole rotator 1, a friction piece 631 of the clutch 63 will be pushed out, the whole rotator 1 and the wheel drum 62 will couple and lead the tire moving forward, as to achieve the driven efficiency. A circuit controller 32 controls all current directions of a site sensor 31 and the electromagnet pole module 2. Besides, the above-mentioned structure can mount with a front or a rear wheel or both.

Figure 11B:
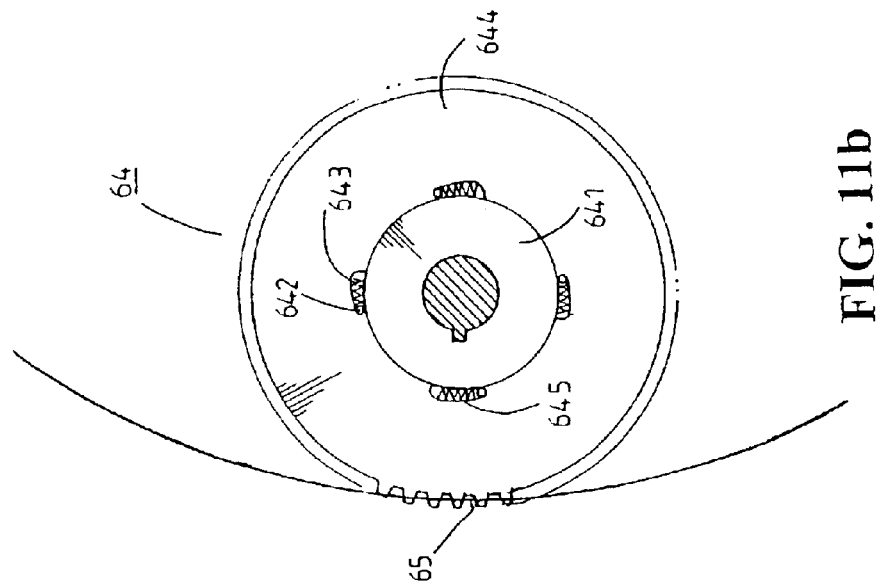
Figure 11A:
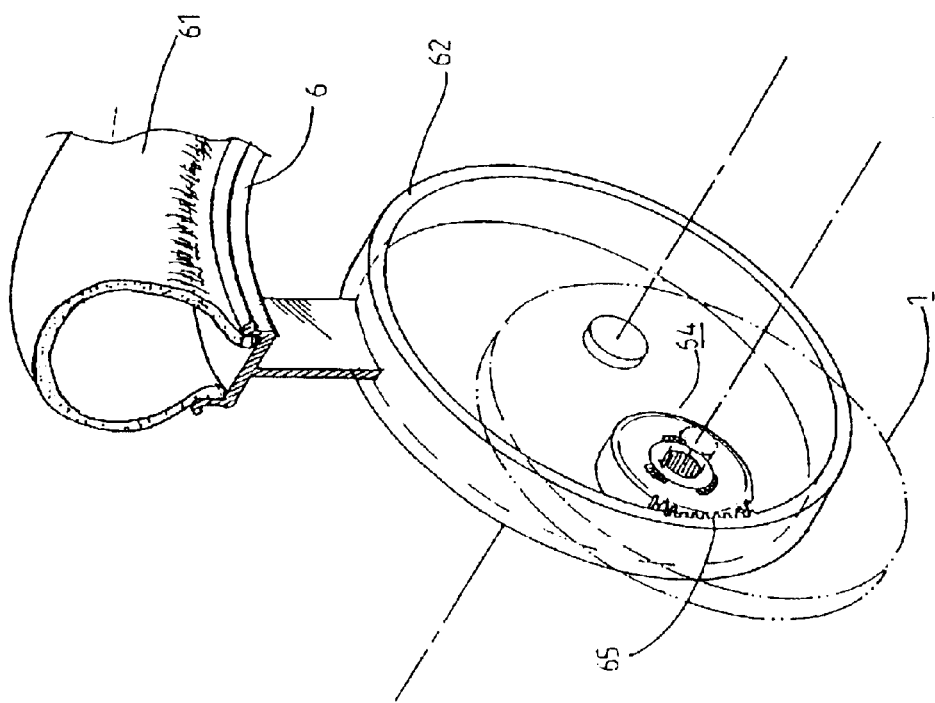
FIG. 11a is another type of the clutch assembly schematic view of the second preferred embodiment of the present invention.

As shown in FIGS. 11*a*, 11*b*, having being another preferred embodiment of a clutch installation, wherein, both axles center of a wheel case 6 and a whole rotator 1 are placed in a biased method. An inner ring of a wheel drum 62 of the wheel case 6, a parallel gear 65 is provided. At the end structure of the axle center of the whole rotator 1, a transmission clutch gear 64 is disposed, which is exactly coupled with an internal side of the parallel gear 65. A transmission gear 644, a plurality of dent holes 645 are provided, the dent hole 645 shape is formed into a small arc and a large arc; a cutting thread is mounted over. Those dent holes are placed in with a spring 643 and a round lock 642. When a sleeve tube 641 has been turned by the axle center of the whole rotator in anti-clockwise direction, due to the function of the friction force, the round lock 642 will has shifted to the small arc of the dent hole and generated a holding force, so that the axle center will has to lead its transmission gear 644. Otherwise, as the wheel drum 62 turning velocity is rapid than the transmission gear 644, the round lock 642 will shift towards to the large arc of the dent hole, and loss it holding force, the sleeve tube 641 and the transmission gear 644 will loss it connection and achieve the clutch effect.

Figure 12:
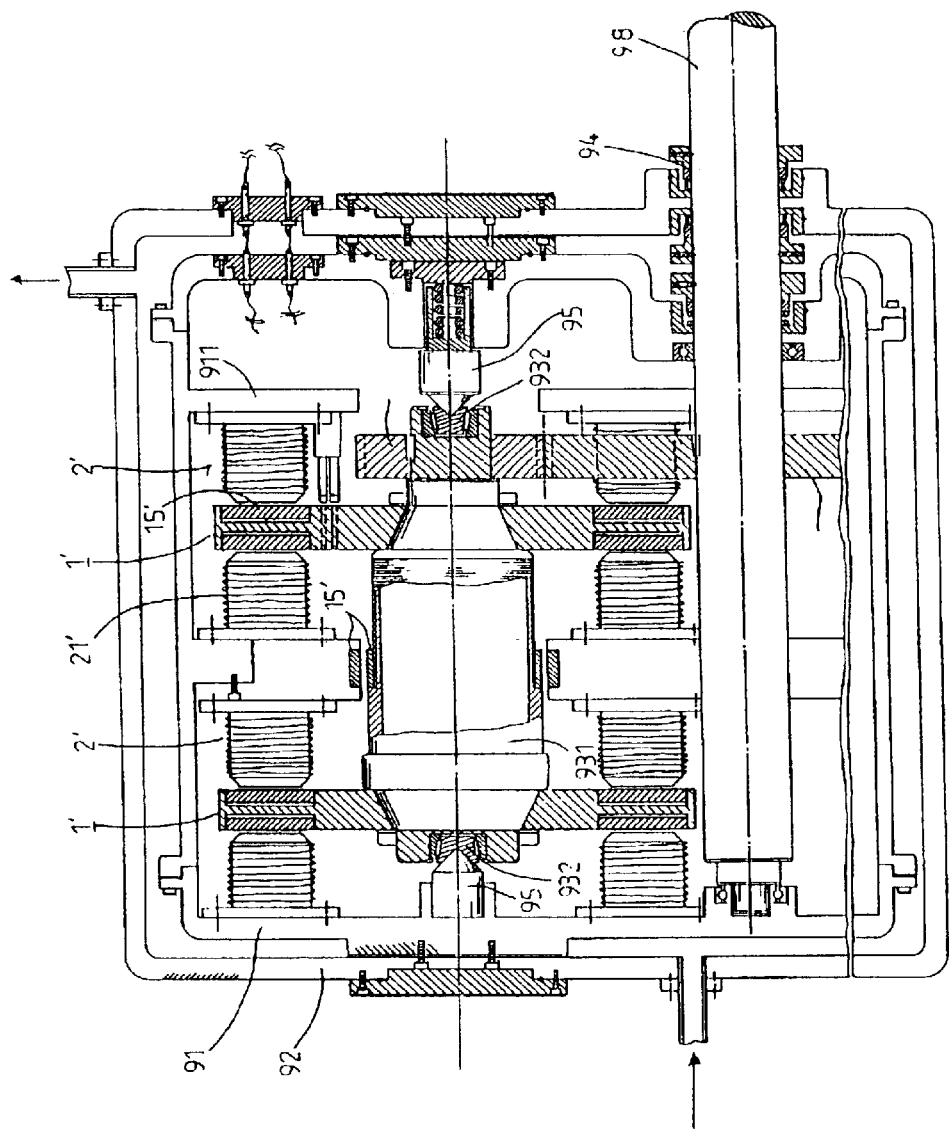
FIG. 12 is the structure schematic view of the third preferred embodiment.

As shown in FIG. 12, having being another preferred embodiment of the present invention for the car, as to reduce the magnet resistant coil and raise the electromagnetism of a magnet pole coil, and the coolant having being engaged as a medium auxiliary; wherein; is comprised an internal shell 92, a whole rotator 1, a electromagnet coil module 2 and a transmission mechanism, and other components are mounted inside. An external shell 92, an internal shell 91 is placed in the external shell and maintained a clear clearance. The coolant will flow into one end, and flow out from the other end, as to accomplish the object of reducing the internal components temperature of the internal shell 91, the outer part of the external shell has been covered with an insulation material, as to maintain the temperature and prevent to loss it easily. The above-mentioned of the whole rotator 1 is mounted at a rotating axle 931, both ends of the rotating axle 931; a stop push axle bearing 932 is provided. On the internal shell 91, a peak pin 95 is disposed, in which both ends are separately set in the position of the rotating axle 931 and it can be a free rotation. At the center of the rotating axle 931, a perpetual magnet ring is provided, and having the inter-repelling function with the same pole magnet of an internal shell extended housing 911. On the rotating axle 931, at least one set of the whole rotator 1 is provided. On the other both faces of the whole rotator 1, a perpetual magnet is disposed individually, at least one set of the electromagnet pole module 2 is constructed at the internal shell extended housing 911 and become a relative site to the perpetual magnet. The magnet pole coil 21 adjacent, it conductive magnet coil seat can form into a body. After the rotation of the rotating axle by the function of the magnet pole coil 21 and the perpetual magnet 15, the generating power will transmit from an active gear 96, which has constructed at one end of the rotating axle to a passive gear 97 of an output axle 98. The output axle will transfer out the power. Due to the coolant has beneficially increased the electromagnet efficiency, plus it can increase more sets of the electromagnet pole module and the whole rotator. Therefore, the preferred embodiment can produce a very good power, as to accomplish the object of the car power.

While the invention has been described with respect to preferred embodiment, it will be clear to those skilled in the art that modifications and improvements may be made to the invention without departing from the spirit and scope of the invention. Therefore, the invention is not be limited by the specific illustrative embodiment, but only the scope of the append claims.

I claim:

1. The magnet motor of an electric vehicle, comprising:
    a whole rotator,
    an electric magnet pole module having a site sensor and a shell housing,
    a circuit control unit;
    all loops of site sensor and the electromagnet pole module are connected back to the circuit control unit;
and, said vehicle comprising:
    a wheel case having a wheel drum,
    said wheel drum having a general cylindrical shape being divided into a first circular portion and a second circular portions, wherein said first and second circular portions are opposite each other with respect to a center of the wheel drum, and
    said wheel drum further having an inner ring;
wherein:
    the whole rotator and electromagnet pole module are located at the vehicle wheel case;
    a triggering apparatus is located near said second curcular portion of said wheel drum,
    said first circular portion of the wheel drum having an inner face, a friction face that made of friction resistant material is provided on said inner face thereof;
    a clutch is located within said first circular portion of the wheel drum, and
    said clutch is mounted adjacent said whole rotator,
    a wheel axle passing through a center of said electromagnet pole module with said shell housing, said whole rotator, said centrifugal clutch, said the wheel drum, and said triggering apparatus, and
    both ends of wheel axle protruding from a support means,
    said support means having bolt seats protruding out from said support means;
    said both ends of wheel axle are fastened with support means by screw nuts so that said support means securely support said electromagnet pole module with said shell housing, said whole rotator, said centrifugal clutch, said the wheel drum, and said triggering apparatus.

2. The magnet motor of an electric vehicle of claim 1, wherein the triggering apparatus is either a plate shaped triggering apparatus or a drum shaped triggering apparatus.

3. The magnet motor of an electric vehicle of claim 1, wherein:
   said clutch, said whole rotator and axle center of said wheel case are placed in a biased method, and,
   a parallel gear is provided at said inner ring of said wheel drum,
   a transmission clutch gear is disposed at an end structure of an axle center of the whole rotator, wherein said axle center of said whole rotator is coupled with an internal side of the parallel gear and the transmission gear,
   a plurality of dent holes are provided, the dent hole is shaped into a small arc and a large arc shapes,
   a cutting thread is mounted over thereof, and
   the dent holes are placed in with a spring and a round lock.

4. A magnet motor of an electric vehicle comprising
   at least one whole rotator,
   at least one set of electric magnet pole module, and
   a circuit control unit, wherein
   the whole rotator and the electromagnet pole module are separately located at internal and external layers of an internal shell; wherein,
   said internal shell including:
   an inner shell,
   a rotating axle,
   a stop push axle bearing is provided at each of both ends of the rotating axle,
   a peak pin is disposed on the internal shell;
   both ends of said peak pin are separrely placed in a position of the rotating axle, a permanent magnet ring is provided at a center region of said rotating axle,
   wherein said magnet ring having an inter-repelling function with the same magnetic polarity magnet of an extended housing from the internal shell, and
   said at least one whole rotator is provided on the rotating axle, wherein
   said whole rotator having a plurality of separate magnets on opposite faces thereof,
   wherein said magnets are disposed individually,
   said at least one set of the electromagnet pole module is constructed at the extended housing of said internal shell, wherein said extended housing said magnets and said at least one set of the electromagnet pole module are positioned relate to one another;
   said at least one set of electric magnet pole module having a plurality of magnet pole comprising conductive magnet coil seat and magnetic coil winding, and all loop of a site sensor and the electromagnet pole module are connected back to the circuit control unit,
   said vehicle further comprising:
   an active gear constructed at one end of the rotating axle,
   said active gear is engaged with a passive gear of a transmitting axle for transmitting output power
   an external shell covering said internal shell, wherein an air gap clearance is provided therebetween said external and internal shells, and
   a coolant flowing into one end of said external shell and flow out from the other end thereof.

5. The magnet motor of an electric vehicle of claim 4, wherein
   an outer part of the external shell is covered with an insulation material so as to maintain the temperature and prevent thermal loss.

* * * * *